(12) United States Patent  (10) Patent No.: US 7,728,712 B2
Girgis et al.  (45) Date of Patent: Jun. 1, 2010

(54) DIGITAL COMMUNICATION SYSTEM WITH SECURITY FEATURES

(75) Inventors: Michael Girgis, Toronto (CA); Ian Robert Gadsby, Toronto (CA); Jake Neiman, Concord (CA); Dmitri Melamed, Toronto (CA); Daniel Joseph Fraser, Toronto (CA); Jeffrey David Findlay, Toronto (CA); Stephane Yvan Gagnon, Toronto (CA); Andrew Kilpatrick, Toronto (CA)

(73) Assignee: OneStop Media Group, Toronto, Ontario (CA)

( * ) Notice: Subject to any disclaimer, the term of this patent is extended or adjusted under 35 U.S.C. 154(b) by 467 days.

(21) Appl. No.: 11/556,467

(22) Filed: Nov. 3, 2006

(65) Prior Publication Data

US 2007/0226762 A1  Sep. 27, 2007

Related U.S. Application Data

(60) Provisional application No. 60/783,862, filed on Mar. 21, 2006.

(51) Int. Cl.
*G08B 5/22*  (2006.01)
*H04Q 1/30*  (2006.01)

(52) U.S. Cl. .................. 340/7.48; 340/7.59; 340/7.51

(58) Field of Classification Search ............ 340/286.01, 340/541, 577, 7.1, 7.2, 7.58, 7.59, 7.61, 7.62, 340/311.2, 7.46, 7.48, 7.5, 7.51, 7.53, 7.54, 340/7.55, 7.56, 7.57
See application file for complete search history.

(56) References Cited

U.S. PATENT DOCUMENTS

| 3,975,583 | A | * | 8/1976 | Meadows | 348/460 |
|---|---|---|---|---|---|
| 5,495,283 | A | * | 2/1996 | Cowe | 725/33 |
| 5,512,935 | A | * | 4/1996 | Majeti et al. | 725/33 |
| 5,548,323 | A | * | 8/1996 | Callahan | 725/33 |
| 5,761,601 | A | * | 6/1998 | Nemirofsky et al. | 725/34 |
| 5,825,407 | A | * | 10/1998 | Cowe et al. | 725/143 |
| 6,226,642 | B1 | * | 5/2001 | Beranek et al. | 707/10 |
| 6,407,673 | B1 | * | 6/2002 | Lane | 340/901 |
| 6,498,987 | B1 | | 12/2002 | Kelly et al. | |
| 6,543,051 | B1 | * | 4/2003 | Manson et al. | 725/33 |
| 6,837,436 | B2 | * | 1/2005 | Swartz et al. | 235/472.02 |
| 7,088,352 | B2 | * | 8/2006 | Wampler | 345/204 |
| 7,159,230 | B2 | * | 1/2007 | Manson et al. | 725/33 |
| 7,233,781 | B2 | * | 6/2007 | Hunter et al. | 455/404.1 |
| 7,277,018 | B2 | * | 10/2007 | Reyes et al. | 340/573.1 |
| 7,324,003 | B2 | * | 1/2008 | Yun | 340/601 |

(Continued)

FOREIGN PATENT DOCUMENTS

CA  2484733  11/2003

*Primary Examiner*—Travis R Hunnings
(74) *Attorney, Agent, or Firm*—Jeffrey M. Measures; Borden Ladner Gervais LLP

(57) ABSTRACT

A digital communication system is disclosed, that allows a display of override content to interrupt a display of ongoing content on one or more display units. Ongoing content, such as advertisements, news, entertainment, or other relevant information, is provided on the display units until an urgent or security-related alert is required, and display of override content becomes necessary. Override content can include information relevant to the security of a passenger or passer-by viewing the display. Override content can relate to security threats such as accidents, major delays, fire, missing children, terrorist activity, or other content deemed adequately pertinent to warrant interrupting the display of ongoing content.

14 Claims, 3 Drawing Sheets

U.S. PATENT DOCUMENTS

| | | | |
|---|---|---|---|
| 7,416,056 B2 * | 8/2008 | Kim | 187/314 |
| 7,460,020 B2 * | 12/2008 | Reyes et al. | 340/573.1 |
| 2001/0034652 A1 * | 10/2001 | Kondo et al. | 705/14 |
| 2003/0109985 A1 * | 6/2003 | Kotzin | 701/209 |
| 2007/0011051 A1 * | 1/2007 | Findlay et al. | 705/14 |
| 2007/0100698 A1 * | 5/2007 | Neiman et al. | 705/14 |

* cited by examiner

DIGITAL COMMUNICATION SYSTEM WITH SECURITY FEATURES

CROSS REFERENCE TO RELATED APPLICATIONS

This application claims the benefit of priority of U.S. Provisional Patent Application No. 60/783,862 filed Mar. 21, 2006, which is incorporated herein by reference.

FIELD OF THE INVENTION

The present invention relates generally to automated display systems. More particularly, the present invention relates to methods and systems for the control and management of electronic display systems.

BACKGROUND OF THE INVENTION

There are a number of different dedicated media through which advertising, entertainment, information, and security and alert messages are separately provided in public spaces where people tend to congregate or queue, such as in transit networks or on elevators. These media include print advertisements, digital displays, and auditory public address systems. Inundation with different media makes it challenging to disseminate urgent security and alert information due to competition between different media for an individual's attention. Also, the cost of installing, maintaining and operating separate systems for each content type and content provider is burdensome to the managers of public spaces.

For example, in transit networks, digital information displays, generally referred to as passenger information display systems (PIDS), are often used to provide information regarding the transit network. PIDS can be used to display general information, such as scheduling information, and security and alert information. Such display systems may also be supplemented by separate public address or other audio systems. The content displayed by a PIDS is typically provided as a text-based display in a periodically updated, pre-recorded loop that a passenger reads as a scrolling message. Display systems on transit vehicles can also be provided with pre-recorded or real-time data streams for display to passengers within transit vehicles. In real-time and "near real-time" systems, the information can be fed directly to the transit vehicle, such as wirelessly, or can be otherwise updated at fixed positions along the route, or in stations and bus shelters.

Separate advertising media, such as billboards, posted advertisements, or electronic equivalents are also typically used to provide advertising to passengers or users, and in doing so provide a source of revenue to the transit authority. In general, advertising space is sold to an advertiser, and an ad is displayed in a designated space for a set time period.

There has also been a move on the part of many managers of public spaces, such as transit authorities, to deploy digital advertising displays as a new source of advertising revenue. Since such digital advertising systems are generally separate and distinct from the security and alert systems already installed, new infrastructure is required when such displays are introduced, the cost of which is generally assumed by the transit authority. Although such infrastructure costs may eventually be off-set by advertising revenue, the cost of adopting such new technology can be significant.

In view of the significant costs associated with maintaining separate dedicated infrastructures, and the time and effort required to manage and administer each separate system, it is, therefore, desirable to provide an integrated security alert, messaging and advertising system. Such a system could also alleviate user distraction due to inundation by multiple media formats, displays and content types.

SUMMARY OF THE INVENTION

It is an object of the present invention to obviate or mitigate at least one disadvantage of previous communication systems.

In a first aspect of the invention, there is provided digital communication system for distributing ongoing content and override content to a plurality of display units. The system comprises an override controller for receiving an override control signal and for retrieving override content from an override media source, and a content distribution controller for controlling ongoing content for dissemination to the display units; and for overriding, on receipt of the override control signal from the override controller, the ongoing content in preference to the override content.

In a second aspect of the invention, there is provided a method of providing security alert information in a digital communication system for distribution to a plurality of display units displaying ongoing content. The method comprises steps of receiving an override control signal, retrieving override content in response to the override control signal, and formatting and transmitting override content to the display units to interrupt ongoing content.

In a third aspect of the invention, there is provided a method of providing security alert information to passengers in an elevator of a building, the building having a digital communication system for distribution of ongoing content to a display unit mounted in the elevator. The method comprises steps of receiving an override control signal, retrieving override content containing security alert information in response to the override control signal, and formatting and transmitting override content to the display unit to interrupt ongoing content.

Other aspects and features of the present invention will become apparent to those ordinarily skilled in the art upon review of the following description of specific embodiments of the invention in conjunction with the accompanying figures.

Advantageously, certain embodiments of the invention permit a security alert to be broadcast both visually and audibly without requiring maintenance of a separate, only occasionally-used, emergency communications system. By allowing an emergency message to over-ride ongoing visual advertising on the same display, a passenger's undivided attention is immediately drawn to the emergency message on a strategically placed display. In this way, maximum impact can be realized.

As a further advantage, cost savings can be realized for the transit authority or building management that incorporates the system according to the invention in place of separate systems for advertising, entertainment, security, passenger information or emergency messaging. The simplicity of administering a single system in lieu of multiple parallel systems also offers the advantage of reduced personnel and associated costs.

In yet a further advantage, the transit authority or building management can use the system of the present invention to generate revenue and/or pay for itself and its associated infrastructure. In particular, the transit authority or building management can have a third party provide the system of the present invention for free, with the third party reaping in sponsored content and advertisement revenues. In some cases it can make more sense for the transit authority or building management to purchase the system and generate some revenue through sponsored content and advertising to offset the cost of the system.

According to specific embodiments of the invention that incorporate additional security features, such as integration with security devices, there is the added advantage that messages responsive to a security threat can be provided as soon as the threat is detected, potentially averting undesirable situations.

BRIEF DESCRIPTION OF THE DRAWINGS

Embodiments of the present invention will now be described, by way of example only, with reference to the attached Figures.

DETAILED DESCRIPTION

The invention provides a system that allows a display of override content to interrupt, modify or supplement a display of ongoing content. Ongoing content, such as advertisements, news, entertainment, or other relevant information, continues until the provision of override content becomes necessary. Override content can include information relevant to the security of a passenger or passerby viewing the display. For example, override content can include security alerts related to security threats such as accidents, major delays, fire, missing children, terrorist activity, or other content deemed adequately relevant to interrupt the display of ongoing content, as described in more detail below.

The system offers the advantage that advertising feeds, television broadcasting, community messaging and emergency security broadcasts can be integrated into a single digital media management system, sharing consolidated infrastructure and display units. The system has all of the advantages of a conventional security alert system, while offering the additional advantage of revenue generation through advertisements and sponsored ongoing content. The system can displace conventional emergency messaging systems, such as public address systems, and advantageously allow emergency override control by a party such as a transit authority, building management, police or other centralized authority. The redundancy between entertainment systems, advertising systems, transit authority displays (PIDS), and security alert systems can thus be eliminated.

Figure 1:
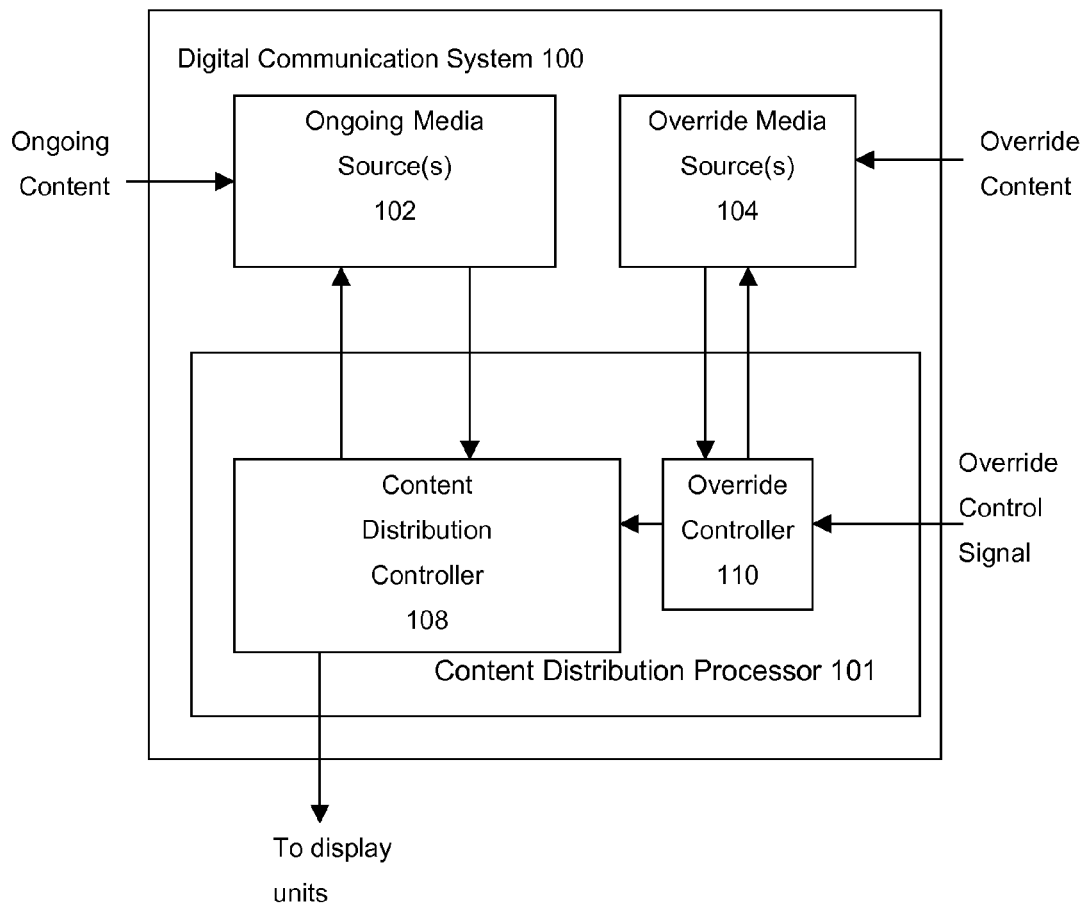
FIG. 1 shows a system according to an embodiment of the invention.

FIG. 1 schematically illustrates a system 100 according to an embodiment of the invention. System 100 is capable of receiving and displaying or disseminating ongoing content from an ongoing content source(s) 102 and from an override content source(s) 104. Control of the display or dissemination of the ongoing and override content is controlled by a content distribution processor 101 comprising a content distribution controller 108 and an override controller 110. The processor 101 can be any suitable general-purpose or specialized microprocessor. The ongoing and override content can be provided through one or more external feeds, internal or external storage means, or any combination thereof. Ongoing content is received or retrieved from the ongoing content source 106 and provided to the content distribution controller 108. The content can include, for example, pre-recorded advertisements, live feeds of ongoing telecasts, and scrolling text-based messages or tickers. The ongoing content is provided to the content distribution controller 108, and is processed or configured as appropriate for display or other dissemination.

When an override control signal is received at the override controller 110, the override controller 110 retrieves or receives override content from the override media source 104. The override content can include, for example, a pre-recorded urgent alert, information, or message, or a real-time source of information such as a live emergency broadcast. The override controller 110 then transmits an override signal to the content distribution controller 108 to invoke an appropriate override process. The override controller 110 then receives or retrieves the override content from the override media source 104, and provides the override content to the content distribution controller, which, in turn, interrupts, modifies or supplements the currently displayed ongoing content. The override content provided by the override controller 110 will generally take priority over any ongoing content, and will be displayed over the entirety of the display unit or only on portions of the display unit. The override controller 110 can, optionally, route the override content directly to the content distribution controller 108.

The system allows generation of revenue, and thus need not simply be viewed as a necessary security expense. When not in use for relaying urgent security-related content, display units are used in such a way as to generate revenue through advertising, sponsorship, or through an outside party purchase of content-viewing time. Such revenue can accrue to a party responsible for administration of the system, or can accrue to the transit authority or building management on whose property display units are provided. These revenues can potentially pay, at least in part, for the costs to deploy, operate and maintain the system.

For example, advertisements or sponsored content time slots can be purchased by an outside party. Revenue-generating content can be provided in any acceptable format, and can be displayed across the entire display unit, or only a portion thereof. Advertising or sponsored content can be tailored to a particular demographic of individuals or passengers, or to a specific time of day. Revenue generating time-slots can be purchased by interested parties on a fee-per-unit-time basis, and adjusted to reflect the portion of the display unit used.

Ongoing content need not be revenue-generating. For example, visual entertainment can be provided to achieve a desirable ambiance. For example, it can be desirable to display placid scenes to calm exasperated travelers, or provide local or regional news feeds to inform travelers during commuting hours. Such entertainment could have some revenue generation associated with it through a named sponsor.

If a display system is incorporated into a transit network, ongoing content can include the type of information currently provided through text-based passenger information display systems. Examples of such information include current time, anticipated time until the next train, minor delays, etc.

The system can incorporate any acceptable display unit to display content. For example, one or more television monitors, computer screens, or other type of digital display can be used as a display unit, the size and quality of which can be selected according to such parameters as space available, budget, and current infrastructure of the environment in which the display unit is to be installed. As exemplary types of display units, LED, plasma, LCD, rear projection, electronic flexible paper, light projection, or tube-based (cathode ray tube or "CRT") screens or monitors can be used.

Control of the ongoing content for the display unit can be done through a centralized ongoing content administrator. The ongoing content administrator can include individuals responsible for soliciting advertising and acquiring or accessing other types of ongoing content that they deem appropriate to users of the system. For example, if the system is for use in an elevator of an office tower, an appropriate advertiser can be a restaurant located in the ground-floor level of the office tower. The ongoing content administrator can solicit appropriate advertising content from the proprietor of the restaurant as ongoing content. Further, control of the ongoing content can be automated through a website to which potential advertisers are invited, and through which advertising options are presented and rendered available for purchase. Curating such a website can be the responsibility of the ongoing content administrator.

Ongoing content can be provided to the system in any way that allows a party responsible for providing ongoing content to provide the desired content to the display units. An example of providing advertising content through adaptive advertising can be found in commonly-owned U.S. application Ser. No. 11/456,386, entitled "Adaptive Advertisements" and filed Jul. 10, 2006, the entirety of which is herein incorporated by reference.

Briefly, this exemplary mode of implementation allows display of adaptive content, such as advertisements, through a communications system coupled with storage and processing facilities that can communicate with a central control system using a standard communications network, such as the Internet or suitable alternatives. A private wired and/or wireless network can be employed to connect display units to a central control system to permit distribution of advertising content to the display units.

Each display unit can be part of a network, or a standalone display, and is programmed to allow a dynamic advertising environment. To provide adaptive content in advertisements, an adaptive advertising structure can be used. For example, inputs are provided to the adaptive advertisement, and on the basis of the inputs, the playback scenarios and advertising content are adaptively adjusted.

An exemplary system can have a processor capable of receiving a plurality of inputs. The processor reads a playlist and renders advertisements contained in the playlist to be displayed. The playlist can contain an adaptive advertisement. Should the processor receive an adaptive advertisement, it provides a set of input values to the advertisement. The processor can provide all the inputs it receives to the advertisement, allowing the advertisement to determine which inputs are relevant, or can obtain a list of required inputs from the advertisement and then provide only those inputs. Not all the inputs need to be external or live.

In some embodiments of the system, a transceiver is employed to connect to a central control system. The central control system includes a processor, an advertising database, and a transceiver for connecting to the system transceiver. The central control system can provide the playlist. The use of transceivers to facilitate communications will be understood to include intermediate nodes including portable programming nodes allowing a manual update of the system using a direct wired or wireless connection to a portable programming interface.

An advertisement can be embodied in a software or data structure that includes a decision engine, and a plurality of playback scenarios. These playback scenarios can be either major or minor changes to an advertisement. An advertisement can be made modular, so that it can be rendered against a number of different backgrounds. In such a case, the different backgrounds can be selected as different playback scenarios. In other cases, text displayed in the advertisement can be made modular, allowing different messages to be treated as different scenarios. Other elements in an advertisement, such as video, animations and a price point can all be considered as different playback scenarios.

In an alternative embodiment, individually created advertising content elements are stored in an advertising database with a set of associated criteria. The processor is provided with a playlist, that provides criteria for the selection of content stored in an advertising database. The processor can evaluate the received inputs in view of the specified criteria, including the last time that a particular advertisement played, determines the advertisement to select from the advertising database. The selected content is then rendered by the processor onto display units. For use in a transit system or with other moving vehicles, such as elevators, the system is often not served by always-on connections to the central control system. In such cases, both ongoing and override content can be updated at selected communication points, such as transit stations, bus shelters or street furniture disposed along a bus route.

The location of a display unit can also be used to determine the selection of scenarios for use in the advertising content, allowing advertisers to create advertisements that indicate the presence of a restaurant or other such service for a given location. On mobile installations, such as transit vehicles, the location of the display can be obtained using sensors, such as a Global Positioning System (GPS) receiver that provides a geographic location that can be used as a selection factor for advertising scenarios. Weather forecasts, including UV ratings, humidity indices, and extreme weather warnings, can be used to determine a particular playback scenario that a store can wish to display, allowing for example a department store to advertise umbrellas when the weather calls for rain and sunblock when the UV rating is high.

When the processor controls a plurality of display units, each display unit can receive its own rendered data stream. Furthermore, each of the multiple display units need not use the same display technology. For example, in a transit vehicle, a first display can be a liquid crystal display (LCD), cathode ray tube (CRT) or a plasma screen display, while secondary displays could be electronic-paper (e-paper) displays. A first display unit can be used to display motion and animated advertisements, while e-paper displays could provide auxiliary advertising related to the content on the first display. One skilled in the art will also appreciate that other display technology can also be used without departing from the scope of the present invention.

The signal to override the ongoing content with an urgent message can be provided by an automated system, or can be manually activated. A signal invoking override content can be received based on data inputs from any integrated device, such as discussed in more detail below, or can be automated on the basis of a specialized signal received from a local, regional or national authority, such as the local police, fire department, or the Department of Homeland Security. A manual override signal can also be provided at the instigation of an individual responsible for determining the severity of a security breach. By allowing urgent override content to interrupt ongoing content, there is benefit realized due to the consolidation of infrastructure for security systems and advertising displays that were heretofore administered and maintained as separate entities. Override content can preempt ongoing content if it is deemed adequately important for passengers or other individuals within the vicinity of the display unit. Control of override content can be centralized, for example through centralized service, such as the ongoing content administrator, responsible for control of ongoing content, through the transit authority that has incorporated the display units into their transit network, or through the building management that has incorporated the display units into their elevators. Control of override content can alternatively be de-centralized, or multiple parties can be provided with override control abilities. Exemplary multiple parties could include a transit authority, building management, the ongoing content administrator, the police, a national or regional authority, such as the Department of Homeland Security, or an authority responsible for early alerts relating to missing children (i.e. "Amber" alerts). The ability to interrupt ongoing content with override content can be simultaneously attributed to numerous parties. Advantageously, by including a number of parties in an exclusive list of override content providers, urgent warnings or messages can be rapidly disseminated to passengers.

In some instances, it can be desirable to centralize the control of override content, so that only one party determines whether an urgent situation is one that warrants interruption of ongoing content. For instance, a transit authority can wish to exert central control over override content so that non-urgent messages can be screened out, to avoid unnecessary panic among passengers. In this example, parties having an urgent message which may be of interest to passengers would first contact the transit authority, and the transit authority would make the determination of how and whether to provide an urgent message to passengers.

In many instances, it may be desirable to interrupt all ongoing content on all regions of a display unit to provide override content. However, depending on the level of urgency or the length of time that the override content may be displayed, it may not be desirable to occlude all regions of the display unit. For example, if a missing child is reported, a photograph of the child could be deemed adequately important to display for a lengthy period of time, or until the child is found. In this instance, and depending on the size and aspect ratio of the display unit, the child's photograph could be displayed constantly on one half of the display unit, while ongoing content continues in the other half of the display unit. Combining override content with ongoing content has the added advantage of maintaining the attention of the passengers. If a photograph of a missing child is the only content displayed for a lengthy period of time, even the most sympathetic of passengers can nevertheless become complacent, or tire of staring at the image. However, by attracting the attention of passengers to the monitor through changes in the ongoing content, the attention of passengers to the display unit is held.

Weather warnings are another exemplary type of content that can be provided by the system. For example, if a hurricane or other type of severe weather approaches, an appropriate safety agency can cause interruption of ongoing content and issue an alert to advise passengers or passers-by about the imminent weather. Optionally, the authority responsible for issuing weather advisories can advise a central administrator of the system, which would in turn trigger an automated or manual override of ongoing content.

The system can be used to alert the public to an imminent terrorism-related threat or to terrorist activity in progress. For example, if a bomb threat has issued to passengers in a transit network, override content can interrupt ongoing content to prompt evacuation and advise of the suspected location, and to direct the public away from the suspected target region. As an additional example, if a suspicious package is discovered in an office tower, and evacuation is deemed appropriate, override of ongoing content can be used to assist the building management to disseminate appropriate instructions and messages to passengers on the elevators in the building, or in adjacent buildings.

Override content can be provided directly to the system by authorized persons or entities, or can be provided indirectly to the system by authorized persons or authorities contacting an administrator of the system, or by administrators of the system actively seeking such information or warnings on a regular basis from appropriate authorities. For example, direct or indirect access to the system to provide urgent messages, warnings, alerts, or other override content able to disrupt ongoing content can be granted to authorities such as the police department; the fire department; Department of Homeland Security; other federal agencies involved in national security; local or regional weather reporting officials; local, regional, or national groups responsible for monitoring undesirable activities such as terrorist activity or child abduction; security teams responsible for the immediate environment, such as the transit security team or building security team; or other parties capable of making a reasonable determination of whether a message or warning is adequately important to warrant override of ongoing content.

In the specific example of a transit authority having control over the override content, it would be possible for an outside party to solicit and control the ongoing content, while allowing the transit authority to initiate override content at any time. Because the system receives external data and controls the display unit in accordance with the received data, the display of advertising or other information, such as the expected arrival time to the next station or bus shelter (or arrival time of the next train or bus if at a station or a bus shelter deployed display unit), can be overridden in the event of an incident requiring passenger notification, or by an automated setting, based on a pre-determined parameter. This allows the transit authority to display information in a partitioned region of a display unit, or if sufficiently important, the transit authority can assume control of content of the entire display unit.

As one example of an embodiment of the invention, displays on transit vehicles can have separate ongoing content data streams updated at different points in the transit network, and/or can rely upon stored ongoing content data. This permits virtual real time feeds to be displayed in one region of a display, while static information can be displayed in a different region of the display. Such a system can be preloaded with advertisements, and then receive updated input feeds, including override control signals, for security alerts, news and transit information. The virtual live feed information can be displayed in its own region of displays placed throughout the transit vehicle for viewing by passengers.

An exemplary system, having display units deployed within transit vehicles, can update the display units as the vehicle approaches a transit station, bus shelter, or street furniture along the bus route. For example, Wireless, Wi-Fi, EVDO, leaky cable, digital radio and/or cellular (e.g., constant cellular access) communication can be provided and utilized. To allow content and override control signals to be relayed to the transit vehicles.

The system can also be used for providing both ongoing and override content to the passengers of an elevator. Such an elevator can be situated in, for example, a residential building, airport, office tower, conference centre, government building or complex, parking garage, tourist attraction, or shopping venue. The attention of passengers in an elevator can easily be drawn to a display unit, since the passengers generally face in a common direction, toward the door of the elevator. Further, because passengers can feel awkward about making conversation with strangers in an elevator, their undivided attention will generally be given to such a display unit, that can provide advertising or entertainment content on an ongoing basis. The building management may also wish to provide ongoing content that is relevant to the day-to-day activities within the building.

In the event that an urgent situation arises which passengers in an elevator can need to know about, the override function of the system allows quick notification to those passengers within the elevator. Exemplary situations can include situations relevant primarily to the building and its surroundings, such as fire, security breach, bomb threats to the building, malfunctions of the elevator, etc., and also can encompass urgent situations of local, regional or national impact, such as weather conditions, missing children, terrorist threats, breaking news stories, etc.

Manual and/or automatic control of override content can reside with one or more parties, such as the building management, police and fire departments, or parties external to the building management who may have responsibility for one or more feeds of ongoing content. An appropriate override signal can be transmitted to the system of the present invention to alert those in the building to an emergency situation, and to provide them with, for example, evacuation instructions.

The system can optionally include integration with other security devices in order to respond to a situation, provide instructions, negate undesirable activity, or provide interactive communication capabilities. Such adjunct security devices can be automatically or manually integrated with the system to provide override content, or can function on an ongoing basis using the infrastructure of the system. Such security devices can include surveillance cameras, motion sensors, proximity detectors, global positioning systems, fire alarms, GPS devices, or panic buttons. These security devices can be capable of exerting control over and/or providing content to the override controller, or can simply provide ongoing content. Cameras and all other integrated security devices can use the same or different technology and communication infrastructure as used by the display units (for example, Local Area Networks (LANs) or the Internet). Further, integrated security systems can be used to send data back to the system for manual or automated review, analysis, or other operations. In essence, by providing feedback to the system, such integrated security devices can provide a real-time, interactive process, whereby output can be made responsive to input.

The system can be configured to both send and receive signals among different devices or elements in a transit network, building, or other such environment. When an urgent notification is received, not only is the override content displayed on the display units, but other devices can be activated or notified. For example, if the system receives alert information about a fire in a residential building, it can be configured in such a way as to send information to other devices, not just the display unit. Such devices can include, for example, television monitors or intercoms of the residents of a residential building. Such devices can also includes, for example, wireless mobile personal communication devices such as cellular phones and personal digital assistants (PDAs).

The system and any device integrated into the system can be configured so as to act together in providing a two-way emergency communications channel. When a surveillance camera is integrated with the system, should a problem be detected within a train, bus, on a transit platform, or on an elevator, the surveillance camera and display unit can act together to provide a two-way communication between passengers and a remotely located party, such as the police or transit authority.

One example of a security device integration is the integration of a surveillance camera with a system providing content to display units located on subway platforms. The surveillance camera can capture an image of an illegal activity, such as a robbery. The transit authority security team can observe the robbery in progress through surveillance cameras, but can be unable to quickly mobilize security officers in the area in which the robbery is occurring. As the thief attempts to exit the transit network, display units throughout the transit network are provided with an override feed showing captured security camera footage of the robbery, or other relevant messaging that pertains to the incident. The override feed immediately interrupts the ongoing content, so that as the thief attempts escape, he can be easily identified and apprehended at the exit.

Figure 2:
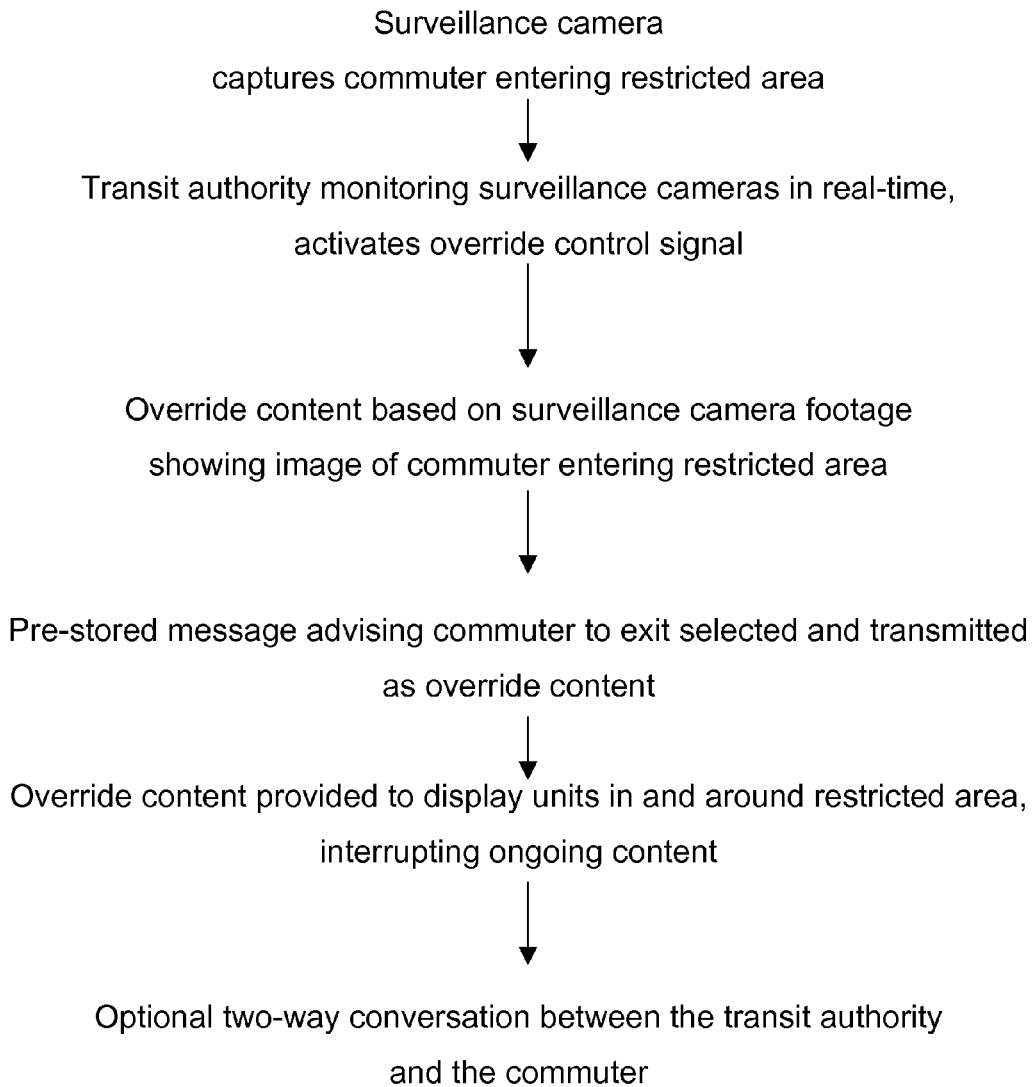
FIG. 2 is a flow diagram depicting an exemplary cascade of events occurring upon receipt of an urgent message by a system interfacing with a surveillance camera.

As another example, an integrated guideway intrusion detection system (GIDS) would allow for a full-screen alert triggered upon a commuter accessing a restricted area of a platform and/or track. The displayed message would advise the commuter to exit the restricted area. Additionally, a security camera integrated to the system of the present invention can use the same infrastructure as that of the GIDS to allow transit authority to see the intrusion and use the displays for live messaging and, provided an intercom system is in place, two-way communication with the commuter. A flow chart depicting this example is shown in FIG. 2.

As a further example of an integrated device, a GPS device can be integrated with a system intended for transit vehicles so as to provide an ongoing feed to the system, showing real-time route location of the transit vehicle on a region of a display unit mounted within a transit vehicle.

As an additional further example, a fire alarm can be integrated with the system. For passengers riding in or trapped in an elevator during a fire alarm, anxiety and panic can set in quickly. In order to alert the individuals within an elevator to information provided by the building management, urgent messages can be provided immediately once the alarm is received. Such messages may be a standard pre-recorded message simply to encourage passengers to remain calm until such time as more information is available, or a tailored message can be provided in real-time. By integrating the display system with a fire alarm device, an immediate urgent message can be relayed without requiring specific intervention by an override or ongoing content administrator. A specific message can be relayed shortly after the pre-recorded message, giving information about which floor received the call about the fire, instructions for assistance, or anticipated time until arrival of the fire department.

Security devices or sensors can be integrated with or connected to the system. In one example, the display unit itself can house a camera. Because the display provides both advertising and information, it is common for passengers or users to look directly at the display. The placement of a camera in the housing of the display, either visibly displayed or hidden, allows the camera to provide the transit authority or other administering authority with images of the ambient surroundings as well as images of persons looking toward the display unit. This allows capture of a clearer image than can be obtained by a typical corner-mounted surveillance camera. Such cameras, whether or not hidden, can be used to obtain images later utilized for facial recognition. For example, if a known felon has escaped in a given geographic location, or if a child has been abducted, cameras mounted within the display unit can permit more front-on shots to be obtained, which can be utilized for manual or automated facial recognition in efforts to locate the felon, missing child, or suspected abductor. The images and video stream captured by such a camera can be used for post-event analysis of a crime or accident.

Facial profiling systems make use of pattern recognition to match captured images to a database of stored images. These systems can be used to determine whether individuals wanted by the police, or other persons of interest, have been using a transit network, or have been seen at a particular locale. Although a common implementation would be for security guards to determine if a passenger is on a watch list, other safety measures can be implemented, including the ability to monitor the faces of children to determine if a child who has been reported as missing has been brought onto a transit vehicle. In the instance where a match is made between an individual to be located, and an image captured on an integrated security camera, the system can automatically override ongoing content to provide an urgent and attention-grabbing full screen alert.

Many jurisdictions have enacted policies that call for an alert to be made public if a child is abducted under certain circumstances. By incorporating a camera in the display system, the invention can provide an input to a facial recognition system that can match the face of a child on a transit platform with a face in a database. If a match is made, the recognition system can provide an input back to the system, which can alert passengers or passers-by to the fact that a child has been reported missing and display information about the child at that location.

Analysis of images captured by a camera, facial recognition or pattern recognition, can be processed at a remote location. Such processing need not be done in real time, but can be done offline with the resources of a separate dedicated computer system. If a match is found between the images captured by the camera and the image of interest, for example a missing child or a wanted terrorist, the captured image can be provided to appropriate authorities and used to update their records, or alert the public if necessary.

A proximity detector or motion sensor can be integrated with the system to provide output to an intrusion detection system that monitors whether an individual has entered a restricted area. If the display is itself located in a restricted area, but can be viewed from outside of the restricted area, such a proximity detector can be integral to a display unit. In such an instance, proximity information can be provided back to the display unit in real time to prompt an override warning message to be displayed on the screen.

Intrusion detection devices can be integrated with the system. Intrusion detection devices can be situated in location remote from the display unit, or can alternatively be integral to the display unit. The display unit can be rendered responsive to an override input triggered by an intrusion detection device. For systems incorporated into residential buildings, should a break-in be detected at a location remote to the display unit, the intrusion detection device can nevertheless communicate an urgent message to override the ongoing content shown on the display unit to alert persons in elevators or elsewhere in the building where display units are mounted, of the intrusion. In doing so, a loud noise or animated graphic can be deployed to alert the intruder to the fact that he has been detected. Optionally, the system can be in communication with the cable television system of the residential building to display the urgent message on the residents' television sets.

Although the display unit can be used to show advertisements or other ongoing content individually on a rotating basis, it is also possible to divide the display unit into two or more regions to allow two or more different messages, or ongoing content to appear on the display unit simultaneously. Each region of the display unit can provide content independent of any other region, or one region can display content that is dependent upon another region. Each region can be controlled by a different input signal or stream. To provide the simultaneous benefit of deriving advertising revenue and displaying content relevant to passengers, the display unit can be arranged to show a plurality of regions simultaneously in a split-screen configuration. For example, as the upper half of the display unit shows an advertisement, a lower half can display regional news headlines.

As an example of two regions having content that is dependent on one another, an advertiser can wish to sponsor non-advertising content, such as an amusing animated vignette, to entertain commuters on a train. As sponsor of the vignette, the advertiser can wish to simultaneously display a non-animated advertisement on a less prominent portion of the display unit for the duration of the vignette. In such an example, the input signal for each region of the display unit can be separate, but the timing of the input signals is dependent because that the vignette and the advertisement are displayed together.

Figure 3:
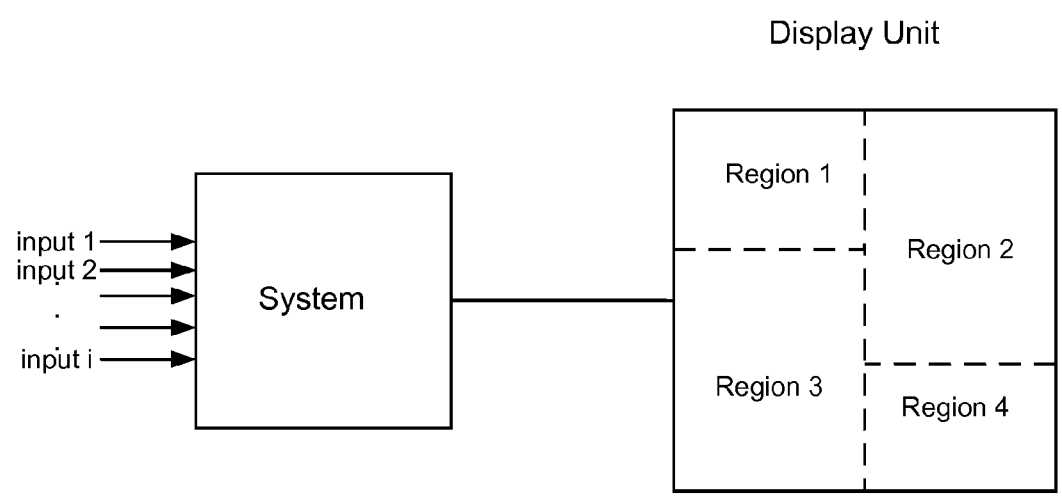
FIG. 3 is a schematic illustration of a system capable of receiving a plurality of input signals and providing content to a display unit.

FIG. 3 schematically illustrates a system according to an embodiment of the invention having a plurality of sources for ongoing content feeds. The ongoing content is provided to and displayed on a plurality of digital display units, one of which is depicted. Upon receipt of ongoing content feeds, the controller distributes ongoing content for display on the display unit. In this instance, the display unit is logically partitioned into four different regions, allowing the display unit to display different content simultaneously. Although not shown here, the display unit can be made up of a plurality of separate, adjacent monitors. Each monitor can be treated as a separate region, or content can be displayed on a region that traverses more than one adjacent monitor. Regions can be stacked horizontally or vertically, or can appear as a mosaic.

The decision to display content in a particular partitioned region of the display unit can be made by a processor in the system based on the received inputs. Although, the inputs are used to receive updated content, they can also be used to receive information such as temperature and location. These data can be provided either by sensors on the exterior of a transit vehicle or at transit stations, bus shelters, or at street furniture disposed along the bus route. This allows external conditions to be used to determine the content displayed on the display unit.

Advantageously, communications previously provided by a transit authority as a text-only display on a small screen can now be displayed on a region of the display unit. While the attention of the passengers can be drawn to the screen because of other content the incidental benefit of viewing transit-related information almost simultaneously will be realized. Display units can be strategically placed at transit stops or on platforms for providing real-time transit-related data. Because the display unit can be partitioned, pseudo-real-time displays can also be deployed on transit vehicles for display of either or both a prerecorded data stream and a data stream received as the vehicle passes by a transit station, a bus shelter. Transit-related information displayed within a transit vehicle can vary, depending on the direction in which the vehicle is traveling, for example, alerting passengers to traffic congestion or delays ahead.

By partitioning the display unit into regions, multiple data streams can be provided to the manager for simultaneous display. Because the display unit can be dynamically controlled, not all data streams of ongoing content need to come from a single source. For example, advertising content can be provided by a first party for display in a pre-determined first region of the display unit. A second party, such as the transit authority or building management, can provide ongoing content in the form of transit-related or building-related information. The content provided by the second party can appear in a pre-determined second region of the display unit. Similarly, additional parties can also wish to provide ongoing content. However, when it is deemed appropriate to display override content on the display unit, the override content can interrupt any or all regions of the display unit. This allows the high priority information contained within the override content message to be displayed on the entire display unit. The override content can be initiated automatically or manually by an administrator. The automatic initiation allows for immediate over-ride of ongoing content so as to take control of the entire display unit.

The system is dynamic in terms of capabilities. The content can include dynamic display content such as video and animation, as well as stationary graphics or text-based messages which can scroll or remain static. The display can additionally include an audible component corresponding to, complimentary to, or separate from the visible display content. The size and positioning of the partitioned regions can be defined either statically or dynamically. In some embodiments, partitioned regions can be defined as static, while other regions are dynamic. The system can also handle a live video broadcast.

The system can receive a plurality of inputs. Content displayed on the display unit can be selected from the received inputs, or can be derived from a pre-existing stored digital media. Not all of the inputs need be active at the same time, nor does the system need to be constantly connected to the input sources.

In one exemplary embodiment, the inputs can be provided in a format that can be encapsulated in an XML or Flash data stream, so that the system can make use of standard XML decoding methods, and Flash/Actionscript front end elements to render information on the display unit. Each region of a display unit can be treated by a rendering engine in the system as a separate display that will be provided its own XML and Flash-based data stream to render. Input formats can vary, and are not limited to this example.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

In the preceding description, for purposes of explanation, numerous details are set forth in order to provide a thorough understanding of the embodiments of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

The above-described embodiments of the present invention are intended to be examples only. Alterations, modifications and variations can be effected to the particular embodiments by those of skill in the art without departing from the scope of the invention, which is defined solely by the claims appended hereto.

What is claimed is:

1. A digital communication system for distributing ongoing content and override content to a plurality of display units, the system comprising:
    at least one display unit divided into two or more regions, each of said regions being capable of displaying a different input signal or stream carrying ongoing or override content; and
    an override controller for receiving an override control signal and for retrieving override content from an override media source; and
    a content distribution controller for controlling ongoing content for dissemination to the display units; and for overriding, on receipt of the override control signal from the override controller, at least one of the input signals or streams carrying ongoing content with an input signal or stream carrying override content;
    wherein at least one region of the at least one display unit is for displaying ongoing content directed to advertising, while a second region is for displaying ongoing content not directed to advertising;
    wherein the override content is displayed only on the at least one region of the display unit for displaying ongoing content not directed to advertising.

2. The system of claim 1, wherein said ongoing content not directed to advertising comprises news, entertainment, location information, or transit-related information.

3. The system of claim 1, wherein the override controller is configured to receive the override signal from a security authority.

4. The system of claim 3, wherein the security authority comprises a police department; a fire department; a weather authority; an anti-terrorism authority; a building manager; or a transit authority.

5. The system of claim 1, wherein the override controller is configured to receive the override signal from a security device.

6. The system of claim 5, wherein the security device comprises a fire alarm, a motion detector, a surveillance camera, or an intrusion alarm.

7. The system of claim 1 wherein the override content comprises security information.

8. The system of claim 1 wherein the ongoing content comprises static visual content, animated visual content, audio content, or a combination thereof.

9. A method of providing security alert information in a digital communication system for distribution to a plurality of display units, the method comprising:
    displaying at least two different input signals or streams carrying ongoing content on at least two regions of a plurality of display units;
    receiving an override control signal;
    retrieving override content containing security alert information in response to the override control signal;

formatting and transmitting override content to at least one of the regions of the display units to interrupt the signal or stream carrying ongoing content wherein at least one region of each of the display units is displaying ongoing content directed to advertising, and at least one other region is displaying ongoing content not directed to advertising; and the override content is transmitted only to the at least one other region of the display units that is displaying ongoing content not directed to advertising.

10. The method of claim 9 wherein receiving an override signal comprises receiving a signal from a security authority.

11. The method of claim 9 wherein receiving an override signal comprises receiving an override signal from a security device.

12. The method of claim 9 wherein the security alert information is provided to passengers in a transit network, the network having the digital communication system and the plurality of display units being mounted within the network.

13. The method of claim 12, wherein displaying at least two input signal or streams carrying ongoing content comprises: displaying at least one signal or stream carrying ongoing content directed to advertising and displaying at least a second input signal or stream carrying ongoing content not directed to advertising.

14. The method of claim 13, wherein formatting and transmitting override content to at least one region of the display units to interrupt ongoing content comprises:

interrupting the ongoing content not directed to advertising.

* * * * *